United States Patent [15] 3,665,473
Heimbigner [45] May 23, 1972

[54] ADDRESS DECODE LOGIC FOR A SEMICONDUCTOR MEMORY

[72] Inventor: Gary Lee Heimbigner, Anaheim, Calif.
[73] Assignee: North American Rockwell Corporation

[22] Filed: Dec. 18, 1970
[21] Appl. No.: 99,440

[52] U.S. Cl. ..........................340/166 FE, 307/215, 340/173
[51] Int. Cl. ................G11c 7/00, H03k 19/34, H03k 19/168
[58] Field of Search.............340/166, 166 FE, 173; 307/205, 307/209, 215, 251

[56] References Cited

UNITED STATES PATENTS 3,533,089 10/1970 Wahlstrom..........................340/173 R
3,539,823 11/1970 Zuk....................................307/205 X
3,541,543 11/1970 Crawford et al. ................340/166 FE

*Primary Examiner*—Donald J. Yusko
*Attorney*—L. Lee Humphries, H. Fredrick Hamann and Robert G. Rogers

[57] ABSTRACT

One address line of a related pair of address lines implementing address decode logic for a semiconductor memory provides an electrical ground discharge path for itself and the adjacent address line of the related pair when neither line is addressed. When one line of the related pair of address lines is addressed, the unaddressed line is converted to an electrical ground line and the addressed line remains charged. The related pairs of address lines provide decode logic for addresses differing at only one bit position (X, X). The different bit positions are implemented by field effect transistors used in precharging the address lines and in evaluating the address input signals.

3 Claims, 7 Drawing Figures

INVENTOR
GARY L. HEIMBIGNER
BY
Robert G. Rogers
ATTORNEY

INVENTOR
GARY L. HEIMBIGNER
BY Robert G. Rogers
ATTORNEY

INVENTOR
GARY L HEIMBIGNER
BY Robert G. Rogers
ATTORNEY

INVENTOR
GARY L. HEIMBIGNER
BY Robert G. Rogers
ATTORNEY

INVENTOR
GARY L. HEIMBIGNER
BY Robert G. Rogers
ATTORNEY

ADDRESS DECODE LOGIC FOR A SEMICONDUCTOR MEMORY

BACKGROUND OF THE INVENTION

1. Field of the Invention

The invention relates to a system for implementing address decode logic for a semiconductor memory and more particularly to such a system in which address lines are converted to ground lines when not being addressed and in which devices implementing one bit position for related pairs of address lines are used in precharging the lines and then evaluating the address signals.

2. Description of Prior Art

FIG. 1 is an illustration of a prior art address decode system for a semiconductor memory. FIG. 1 is illustrated in symbolic form for convenience.

The address decode system includes address lines 1, 2, 3, and 4. Other address lines have been omitted as indicated by the dots between the two pairs of address lines. Sandwiched between the pairs of address lines are ground lines 5 and 6. One ground line is required by each pair of address lines. The decoded addresses are different for each line as indicated by the presence of field effect transistors between each line and an adjacent ground line.

The circles in the figure illustrate gates of field effect transistors connected to the horizontally extending electrical conductors. Vertically extending lines illustrate diffused semiconductor regions of one conductivity type in a semiconductor substrate. For example, the vertical lines may represent diffused p regions in an "*n*" type silicon substrate. The x's illustrate metal contacts to the diffused *p* regions. The outputs are shown as providing inputs to the data storage section of a memory system using the decode logic.

A schematic diagram of one address line of the FIG. 1 address decode logic is illustrated in FIG. 2. For purposes of describing the prior art system, the circuit elements of address line 1 are used in the FIG. 2 schematic diagram.

The address logic for the FIG. 2 circuit comprises a NOR gate function having inputs $A_1$, $A_2$ and $\overline{A}_3$ decodable as address $\overline{A}_1 \cdot \overline{A}_2 \cdot A_3$. The inputs are connected to the gate electrodes of field effect transistors 9, 10 and 11 connected in electrical parallel between node 12 for the precharge clock and node 13. Node 13 is connected through isolation field effect transistor 14 to output node 21. Node 13 is precharged to a first voltage level (−V) through field effect transistor 15 when the precharge clock is true. The gate electrode 17 at transistor 15 is connected to the precharge clock as indicated at node 18.

The horizontal line 16 (see FIG. 1) below gate electrode 17 of field effect transistor 15 represents the connection of gate electrode 17 to the precharge clock line.

The isolation clock is connected to gate electrode 19 of field effect transistor 14 on conductor 20. When the isolation clock signal is true, node 13 is electrically connected to node 21. This occurs during and following the true precharge clock interval causing node 21 to also be precharged. Node 21 is connected to the gate electrode 22 of field effect transistor 23 providing a voltage level at node 24 which represents the decoded address of line 1 after the isolation clock goes false. One electrode of field effect transistor 23 is connected to the boost clock on line 25.

Feedback capacitor 26 between output node 24 and node 21, feeds back a voltage level approximately equal to the true voltage level of the boost clock when the boost clock is true for enhancing the conduction of field effect transistor 23. By overdriving field effect transistor 23, the threshold losses through the transistor are reduced so that the output voltage at node 24 is approximately equal to the boost clock signal level on line 25.

In operation, the precharge clock signal becomes true for turning field effect transistor 15 on. Nodes 12 and 13 are precharged. The isolation clock is also true during the period that the precharge clock is true so that node 21 and therefore capacitor 26 is charged to the voltage level approximately equal to the precharge clock voltage level. During the time that the precharge and isolation clock signals are true, the boost clock signal is false so that node 24 is connected to electrical ground during the precharge period.

Following the precharge period, the isolation clock remains on for holding field effect transistor 14 on. The inputs to the NOR gate logic function are evaluated. During the evaluation period, the precharge clock line is at electrical ground. If either A1, A2, or $\overline{A3}$ are true, capacitor 26 is discharged to electrical ground and field effect transistor 23 is turned off. If neither A1, A2, or $\overline{A3}$ are true, i.e., $\overline{A_1}$. $\overline{A_2}$. $A_3$ are true capacitor 26 remains charged so that following the evaluation period, when the isolation clock becomes false, the boost clock signal becomes true for providing an output at node 24 as previously described.

As shown in FIG. 1 therefore, in order to implement decode logic for a particular address, a precharge transistor; an address decoded addresses. As a result, substantial space as well as a number of field effect transistors (switching devices) are required.

It would be preferred if address logic could be implemented without the necessity for using an electrical ground line and without the necessity for a precharge field effect transistor. The present invention provides address decode logic which does not require the use of a separate ground line or a field effect transistor used solely for precharging.

SUMMARY OF THE INVENTION

Briefly, the invention comprises address decode logic in which pairs of address lines are implemented so that the addresses associated with the lines, i.e., decodable by the lines, are different at only one bit position. This condition is non-restricting for most codes that might be used for addressing purposes. The remaining address bits for each pair of related address lines are identical. The address bits for the different bit positions as well as for the remaining bit positions of each pair of address lines are implemented by switching devices such as field effect transistors inserted between or within conducting paths usually comprising semiconductor regions formed in a substrate for electrical conductors formed on the surface of a substrate.

Field effect transistors of the different bit positions for each related pair of address lines receive inputs for precharging the address lines to a first voltage level during the precharge period of an operating cycle.

Subsequently, the input address signals are evaluated for decoding an address location during the evaluation period of an operating cycle. One field effect transistor of the two transistors implementing the different bit positions for each related pair of nonaddressed address lines is turned on. The turned on transistors of nonaddressed address lines convert the lines to electrical ground lines for discharging the precharge voltage.

When the input signals are evaluated as true by a particular address line, the precharge voltage level is not discharged to ground. In other words, a field effect transistor in the addressed line of a pair of address lines implementing the different bit position is not turned on and the line is isolated from electrical ground. The other field effect transistors are also off at the addressed line. As a result, the voltage level is available for driving an output stage thereby indicating a decoded address. An output stage may include an isolation device and a booster.

It is pointed out that other logic convention may be used. In that case, when a precharge voltage is discharged, the input address signals to the line are evaluated true. In the preferred embodiment the input address signals are evaluated true when the precharge voltage on the addressed line is not discharged.

The address lines are therefore used normally as address lines or as electrical ground lines when input address signals are decoded false. As a result, it is not necessary to provide separate ground lines between each pair of address lines. In addition, by implementing the address decode logic such that pairs of address lines are related, i.e., differ at only one bit position, the switching device implementing the different bit positions can be used for precharging the address lines as well as for addressing the address lines at different operating intervals of the system.

In a typical memory system, both X and Y axis decode logic arrays are used to address locations in a data storage portion of the memory. Addressed locations in the data storage portion provide outputs in the form of signals having different voltage levels as a function of the state of the stored data at the addressed location.

Therefore it is an object of this invention to provide improved address decode logic for a semiconductor memory system.

It is another object of this invention to provide an address decode system in which the address lines are used for the dual purpose of address lines and ground lines.

It is another object of this invention to provide an improved address decode logic array in which the area required for implementing the address decode logic in a semiconductor substrate is significantly reduced by eliminating separate electrical ground lines for discharging precharged address lines.

A still further object of this invention is to provide address decode logic implemented in a substantially reduced area in a substrate by operating nonaddressed lines as electrical ground lines during the input address evaluation period.

It is another object of this invention to implement an address decode logic array using field effect transistors implementing different bit positions of related pairs of address lines for precharging the address line and for evaluating input address signals at the bit positions.

Another object of this invention is to provide address decode logic in which non-addressed address lines are converted into electrical ground lines during an evaluation period and in which devices at certain bit positions provide a precharge voltage to address lines during a precharge period and evaluate input address signals during the evaluation period.

These and other objects of this invention will become more apparent when taken in connection with the description of the drawings, a brief description of which follows.

DESCRIPTION OF PREFERRED EMBODIMENT

Figure 3:
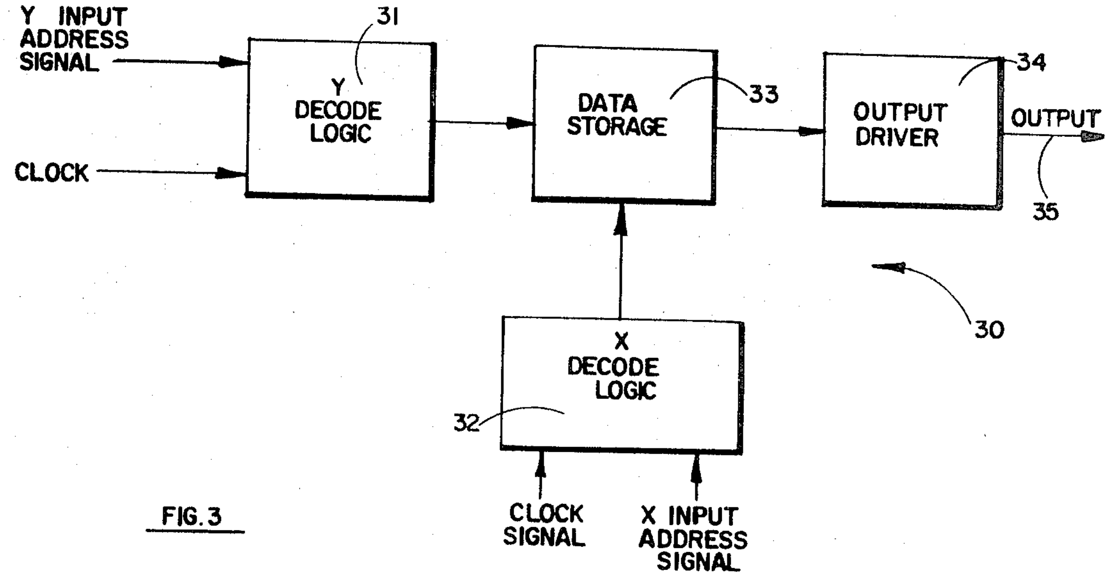
FIG. 3 is a block diagram of a memory system including X and Y axis address decode logic, data storage, and output drivers.

FIG. 3 is a block diagram of a memory system 30 comprising X and Y address decode logic 31 and 32 respectively, data storage 33, and output drivers 34. The present invention is concerned with address decode logic such as represented by either one or both blocks 31 and 32. Both the X and Y address decode logic include address and clock signal inputs. One of the address decode blocks can be implemented by other address decode logic known to persons skilled in the art.

Figure 2:
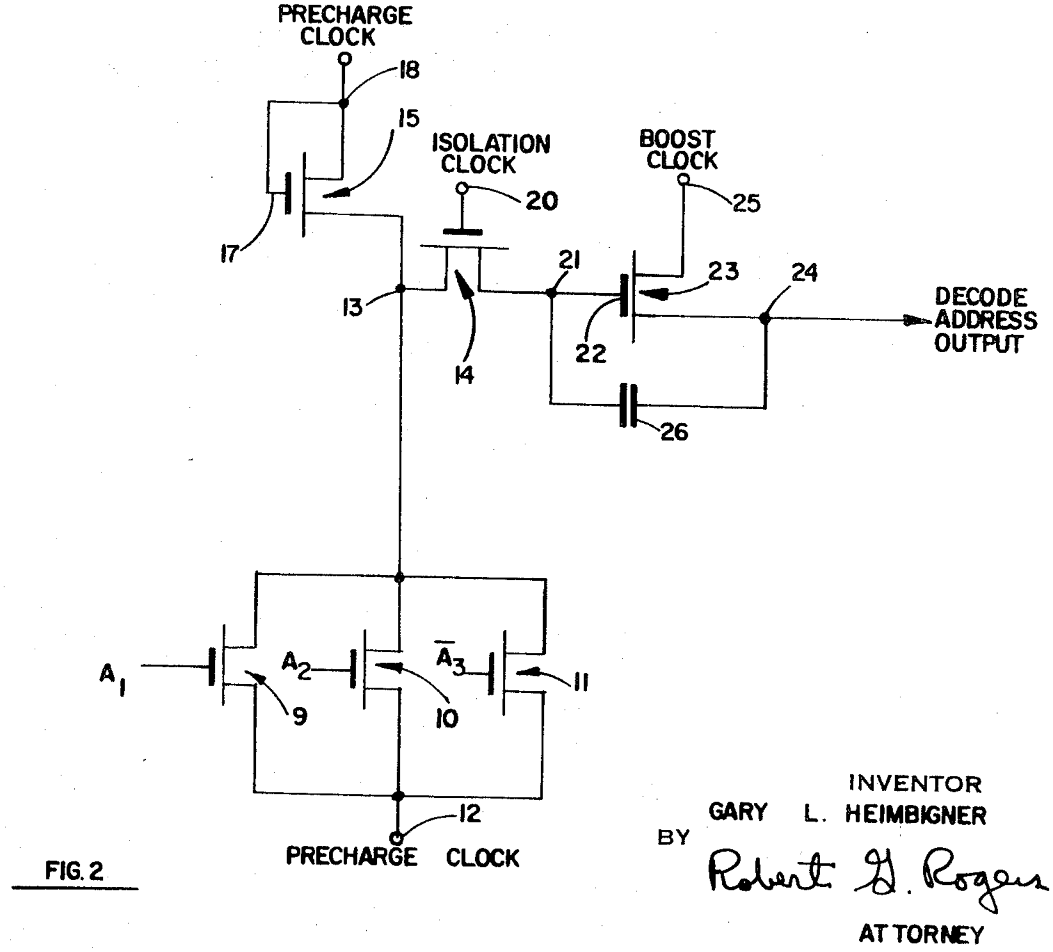
FIG. 2 is a schematic diagram of one address line of the FIG. 1 address decode logic array.

The data storage and the output driver blocks can be implemented by designs known to persons skilled in the art. For example, the data storage block 33 may be implemented by a diode matrix. Alternately, MOS or other field effect storage devices may be used to implement the data storage block. Drivers comprising the output driver block 34 may be implemented by a bootstrap driver such as shown in FIG. 2 or by other circuits for providing the required voltage and current levels at the output identified by numeral 35. Ordinarily a push-pull stage is used to provide voltage levels representing logic 1 and logic 0 outputs.

Figure 4:
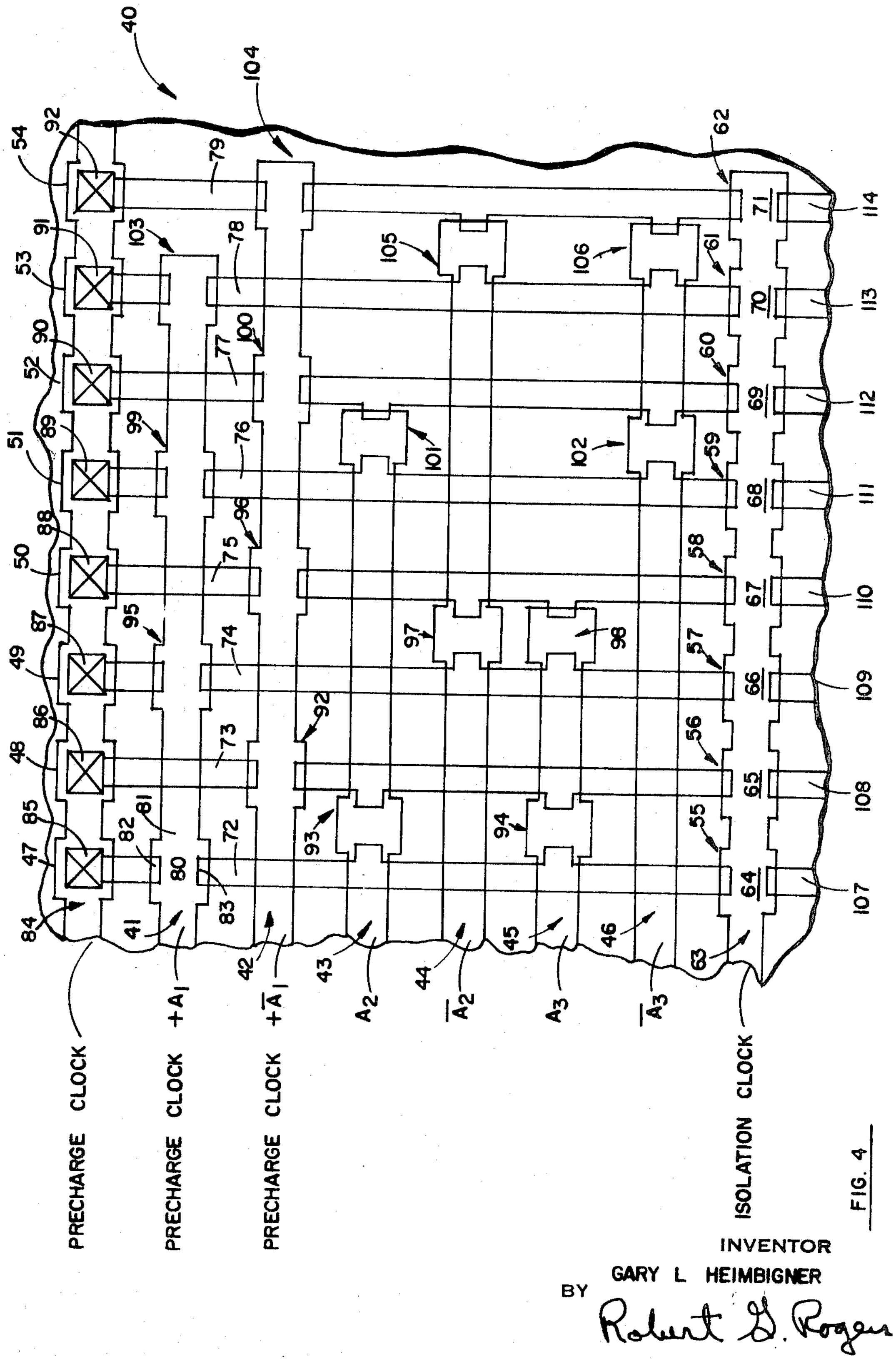
FIG. 4 is a representation of an actual layout of a decode logic array. The actual devices, input/output lines, conducting regions, etc., are shown substantially in the manner in which they appear in a semiconductor substrate.
Figure 5:
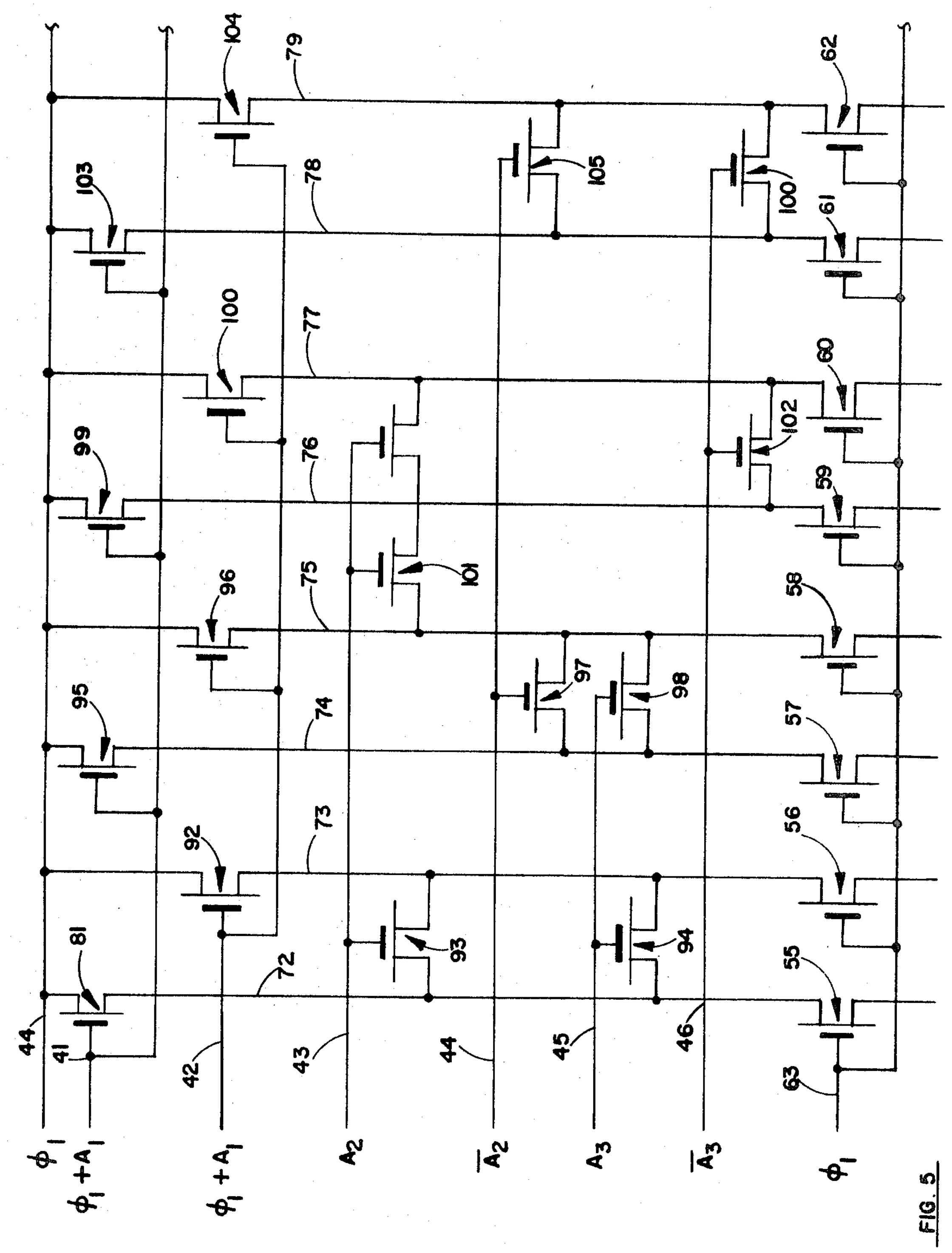
FIG. 5 is a schematic diagram of the FIG. 4 representation.
Figure 6:
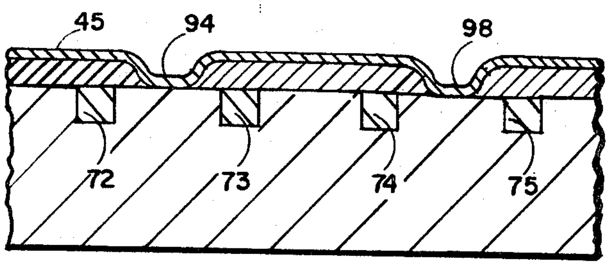
FIG. 6 is a cross-sectional view taken along line 45 of the FIG. 4 representation.
Figure 7:
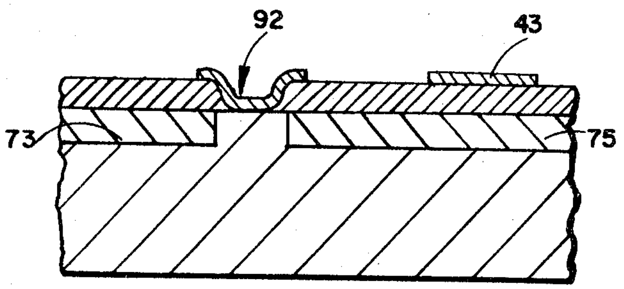
FIG. 7 is a cross-sectional view taken along line 73 of the FIG. 4 representation.

It is pointed out that the preferred embodiment described herein utilizes p channel enhancement mode field effect transistors for implementing the address decode logic. As a result, a true signal level is represented by a negative voltage level, for example, −V. A false signal level is represented by an electrical ground voltage level. Field effect transistors including MOS, MNOS silicon gate, enhancement or depletion mode, complimentary etc, may be used in different embodiments. Processing an *n*-type silicon wafer for producing *p*-regions, metal conducting strips, contacts and gate electrodes as required to implement the address decode logic shown in FIG. 4 is well known to persons skilled in the art. For that reason, process details are not included herein.

It is also pointed out that a particular address decode logic array may include inverters to provide the prime (inverse) of address bits, e.g., A and $\overline{A}$. Since inverters are well known to persons skilled in the art, details are omitted for the present description.

FIG. 4 is a representation of an actual layout of a three bit code decode logic array 40 for decoding eight addresses. The figure illustrates the layout as it would appear when viewing the surface of a chip in which the decode logic had been formed. It should be understood that the size of a decode logic array may vary depending on the requirements of a particular application. The present invention is not limited to the size shown.

The decode logic array 40 comprises input address lines 41 through 46 for address bits $A_1$, $\overline{A_1}$, $A_2$, $\overline{A_2}$, $A_3$, $\overline{A_3}$. The input address lines decode into addresses represented by address lines 47 through 54. Each address line 47 through 54 is isolated from its associated output (107 through 114) by isolation field effect transistors 55 through 62 which are controlled by an isolation clock appearing on conductor 63. The gate regions 64 through 71 for the field effect transistors are represented by the enlarged portions of the conductor 63 which overlaps the semiconductor regions of each address line. The vertically extending semiconductor regions are identified by numerals 72 through 79.

As indicated in the figure, field effect transistors are implemented by placing an insulated gate electrode, for example, gate electrode 80 of field effect transistor 81, over both ends of a gap or separation in a semiconductor region, having a thin oxide region. The ends of the semiconductor region 72 under gate electrode 80 are identified by numerals 82 and 83.

By way of a specific example, assume that the address input signals are false on address input lines 41, 43 and 45. The remaining address input lines 42, 44, and 46 are therefore true. The address which decodes as true by the decode logic array 40 during the evaluation interval is $\overline{A1} \cdot \overline{A2} \cdot \overline{A3}$. As a result, the address line decoding that particular address must remain charged after the evaluation interval. In other words, an address line must not be converted to an electrical ground line via a connection to conductor 84. For the example given, the address line which is not converted to an electrical ground line during the evaluation interval is address line 47 (semiconductor region 72).

As shown in the figure, a false address signal on the gate electrode of field effect transistor 81 does not enable conduction between the separated portions of semiconductor region 72. Similarly, field effect transistors 93 and 94 are held off by false signals on their gate electrodes to prevent conduction from the semiconductor region 72 into semiconductor region 73 which is converted to an electrical ground line since field effect transistor 92 is turned on by the application of a true voltage level on address input line 42. It can also be shown that each of the remaining address lines is converted to an electrical ground line via the connection to the precharge conductor 84. The precharge clock is at electrical ground during the evaluation phase as indicated previously.

Following the evaluation interval, the non-discharged address line remains charged, for example, to −V, and the other non-addressed address lines are at electrical ground. The isolation clock on conductor 63 has been true during and after the precharge clock for connecting the address lines to outputs 107 through 114. Since only one address line remains charged, only one output address is provided. For the example given, a voltage approximately equal to −V would appear at output 107 during the precharge interval and remain there after the isolation clock goes false.

When the address signals are decoded as true by one address line, the line does not discharge to electrical ground. Stated alternately, the address for that line is true for the input signals.

Figure 1:
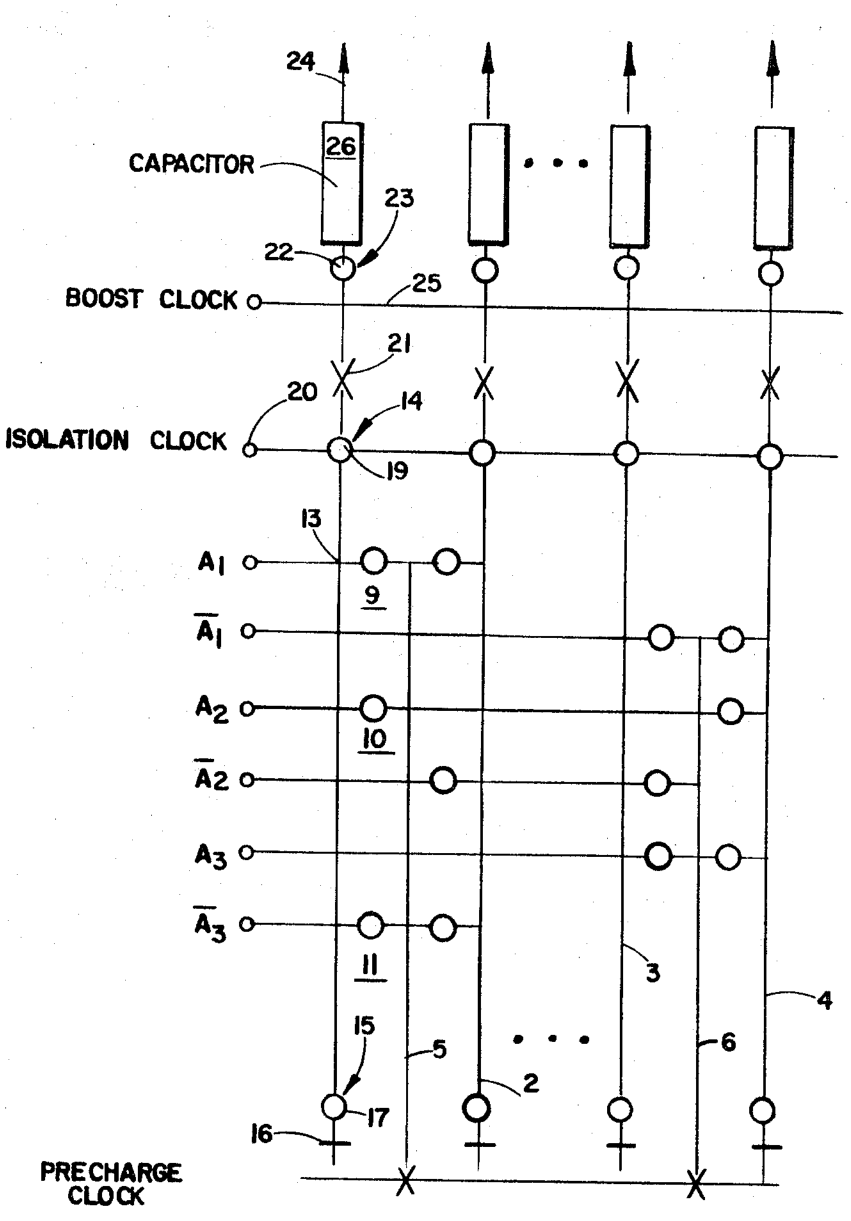
PRIOR ART FIG. 1
FIG. 1 is a representation of a layout representing a prior art address decode logic array.

By referring to FIG. 1, it can be seen that other address decode logic arrays require a separate ground line between each adjacent address line. The ground line in FIG. 1 is identified by the numeral 18. In addition, FIG. 1 illustrates that separate field effect transistors are required for precharging each address line. The precharge transistor in address line 1 in FIG. 1 is identified by the numeral 15.

In the FIG. 4 embodiment, the electrical ground line is eliminated since a nonaddressed address line is converted into a ground line during the evaluation period. The precharge transistor is eliminated by implementing the A1 and $\overline{A1}$ bit positions for each pair of address lines with field effect transistors in the semiconductor regions instead of between semiconductor regions. In effect, the field effect transistors on lines 41 & 42 are utilized as precharge field effect transistors as well as field effect transistors implementing address bits for the A1 and $\overline{A1}$ bit positions.

As indicated above, pairs of the address lines such as 47 and 48, 49 and 50, 51 and 52, 53 and 54, have related addresses. For example, address line 47 decodes as true the address: $\overline{A1} \cdot \overline{A2} \cdot \overline{A3}$. Similarly, address line 48 decodes as true the address: $A1 \cdot \overline{A2} \cdot \overline{A3}$.

From the above addresses, it should be obvious that the addresses decoded by address lines 47 and 48 differ only in the first bit position, i.e., A1 and $\overline{A1}$. The remaining address bits are identical. The different bit positions ($A_1$ and $\overline{A}_1$) are the same for each pair of related address lines. It is possible in other embodiments to change the different bit positions. However, in the preferred embodiment, the different bit positions are the same for each pair of address lines.

It is pointed out that in the usual case, an output booster or driver is provided at each of the outputs 107 through 114 of address lines 47 through 54. For convenience, the output boosters are not shown in FIG. 4. However, a driver such as the driver shown in FIG. 2 can be used. The driver in FIG. 2 includes field effect transistor 23 and feedback capacitor 26. The booster capacitor is not a necessary requirement of the address decode logic.

In operation, each address line is precharged during a precharge period when the precharge clock PC becomes true. A precharge voltage such as −V, is applied through contacts 85 to 92 to semiconductor regions 72 through 79. The precharge clock is also applied to address input lines 41 and 42 so that the precharge voltage level is applied throughout the semiconductor regions comprising the address lines. During the precharge period, the voltage level charges the inherent capacitances associated with the address lines. At the end of the precharge interval, the precharge clock becomes false.

During or following the precharge interval, address signals are applied to address input lines 41 through 46. If the addresses are applied after the precharge becomes false they all must have been previously unconditionally false. A particular address signal depends upon the particular address code in data storage from which data is being read.

For the particular embodiment shown, address input lines have either a true −V voltage level or a false 0 voltage level. The signals represent an address code which is decoded by the logic array 40 during the address evaluation period.

During the address evaluation period, when the field effect transistors of a particular address line are turned on, the charge on that address line is discharged to electrical ground. The address signals are decoded as false by each line that discharges to electrical ground. The electrical ground is provided by the precharge clock conductor 84 which is false, i.e., following the precharge interval. Therefore, a nonaddressed line is converted to an electrical ground line during the evaluation period.

As described subsequently, the address decode logic array 40 requires a precharge clock provided on electrical conductor 84. Contacts between the conductor 84 and the ends of semiconductor regions 72 through 79 are identified by the blocks 85 through 92.

Address bits A1 and $\overline{A1}$ for address lines 47 and 48 are implemented by field effect transistors 81 and 92 in the semiconductor regions 72 and 73. The remaining address bits for the pair of address lines 47 and 48 are implemented by field effect transistors 93 and 94 formed between the semiconductor regions 72 and 73. It should be obvious that the addresses represented (or decodable) by address lines 47 and 48 differ only in bit positions A1 and $\overline{A1}$. The remaining address bits for the air of address lines 49 and 50 are implemented by field effect transistors 95 and 96 in the semiconductor regions 74 and 75 whereas address bits $\overline{A2}$ and A3 for the lines are implemented by field effect transistors 97 and 98 formed between the two semiconductor regions 74 and 75.

The pair of address lines 51 and 52 implement address bits A1 and $\overline{A1}$ by field effect transistors 99 and 100 in the semiconductor regions 76 and 77 whereas address bits A2 and $\overline{A3}$ are implemented by field effect transistors 101 and 102 between the semiconductor regions. Field effect transistors 103 and 104 implement A and $\overline{A}$, for the last pair of address lines 53 and 54. Address bits $\overline{A2}$ and $\overline{A3}$ are implemented by field effect transistors 105 and 106 between the semiconductor regions 78 and 79.

By implementing the address decode logic array 40 in the manner shown, i.e., with the A1 and $\overline{A1}$ bit positions formed by field effect transistors in the semiconductor regions and the remaining address bits formed by field effect transistors between the semiconductor regions, a separate ground line for each pair of address lines is eliminated and the necessity for a precharge field effect transistor for each address line is eliminated. As a result, the semiconductor area required for a particular embodiment of the decode logic array can be substantially reduced.

I claim:

1. Address decode logic for a semiconductor memory comprising, a plurality of address input lines for decoding a plurality of addresses, a plurality of pairs of semiconductor regions, said plurality of address input lines passing over said pairs of semiconductor regions, first and second address input lines representing first and second address bit positions respectively of decodable addresses, said first and second address input lines and said pairs of semiconductor regions forming first and second field effect transistors in electrical series with said pairs of semiconductor regions for controlling the electrical conduction therethrough, said first field effect transistors controlling the conduction through the first semiconductor regions of each pair of semiconductor regions and said second field effect transistors controlling the conduction in the second semiconductor regions of each pair of semiconductor regions, only one of said first and second field effect transistors conducting during a particular address decoding cycle, each address decodable by said address decode logic including one of said first and second address bits, a plurality of coupling field effect transistors electrically connected between certain ones of said pair of semiconductor regions for representing the remaining address bit positions for addresses decodable by said address decode logic, precharge means for actuating said first and second field effect transistors of each pair of said semiconductor regions for precharging said pairs of semiconductor regions to a first voltage level during a first operating interval of a decoding cycle, address means for actuating certain of said coupling field effect transistors and one of said first and second field effect transistors in each semiconductor region and for holding the remaining one of said first and second field effect transistors off and for holding the remaining coupling field effect transistors off as a function of an address being decoded during a second operating interval of the decoding cycle, the field effect transistors being held off providing electrical isolation for the charge on a particular semiconductor region, said isolated charge representing the address being decoded, and discharge means for connecting alternate ones of said semiconductor regions to electrical ground during said second operating interval through the actuated ones of said first and second field effect transistors, said actuated coupling field effect transistors electrically connecting the remaining semiconductor regions to the electrical ground provided by the alternate semiconductor regions connected to electrical ground by said discharge means whereby only the semiconductor region representing the decoded address remains charged to said first level at the end of said second operating interval.

2. Address decode logic for a semiconductor memory comprising, a plurality of input address lines forming a particular address code, a plurality of pairs of related address lines for decoding the addresses of said address code, said pairs of address lines each having first and second field effect transistors in the address lines for being actuated by signals appearing on input address lines corresponding to a particular bit position, one of said field effect transistors being actuated by an input signal appearing on the input address line for one bit of a particular bit position, the other field effect transistor being actuated by a signal appearing on the input address line for the inverse bit of said bit position, said address lines being connected to means providing a precharge voltage level to each address line during a first operating interval and for providing electrical ground to each address line during a subsequent operating interval, said first and second field effect transistors of each of said address lines being actuated by said precharge voltage during said first operating interval for enabling said precharge voltage to be applied throughout the address lines, the remaining bit positions for the address associated with each pair of address lines being implemented by field effect transistors connected between the address lines forming the pairs of address lines whereby said remaining bit positions for each pair of address lines are identical, the first and second field effect transistors of each pair of address lines receive an address signal during said subsequent operating interval for converting the non-addressed address lines into electrical ground lines connected to said means providing electrical ground, the field effect transistors of the addressed line being rendered non-conductive by said input signal for preventing the addressed line from being converted into an electrical ground line whereby the precharge voltage level on said line is available from the addressed line for representing a particular decoded address.

3. Address decode logic matrix comprising a grid of input address lines and parallel disposed semiconductor regions in a semiconductor substrate, alternate ones of said semiconductor regions including first field effect transistors, a first address input line having relatively expanded conductor portions at each semiconductor regions providing gate electrodes for each of said first field effect transistors, voltage levels on said gate electrodes controlling conduction through the associated semiconductor regions adjacent the gate electrode of said first field effect transistor of each semiconductor region, the remaining semiconductor regions including second field effect transistors, a second address input line having relatively expanded portions at each semiconductor region, said expanded portions providing gate electrodes for each of said second field effect transistors, voltage levels on said gate electrodes controlling conduction through the associated semiconductor regions of said remaining semiconductor regions adjacent the gate electrode of said second field effect transistor of each of said remaining semiconductor regions adjacent to said first address input line for controlling conduction in the remaining semiconductor regions, said first and second address input lines implementing prime and unprime address bits of one bit position, a plurality of field effect transistors between pairs of said semiconductor regions including first and second field effect transistors for controlling conduction between semiconductor regions and implementing the remaining address bits for the pairs of semiconductor regions, said plurality of field effect transistors being actuated by signals on said input address lines, and said matrix further including a conductor extending across one end of said recited semiconductor regions and remaining semiconductor regions and electrically connected thereto for providing first and second voltage levels to said recited semiconductor regions and said recited remaining semiconductor regions during first and second operating intervals respectively of said decode logic matrix, said first voltage level being provided on the input address lines connected to said first and second field effect transistors in each of said recited semiconductor regions and remaining semiconductor regions during said first operating interal for applying said first voltage level throughout said semiconductor regions whereby inherent capacitances associated with said semiconductor regions and input address lines is charged to said first voltage level, means applying address signals to selected input address lines as a function of a particular address during said second operating interval, one of said first and second field effect transistors of each semiconductor region and certain ones of said plurality of field effect transistors between pairs of said semiconductor regions being rendered non-conductive during said second operating interval as a function of a particular address for electrically isolating the semiconductor region representing the address for preventing the charge on the inherent capacitance associated with said semiconductor region from being discharged during said second operating interval whereby the charge remaining on said line following said second operating interval can provide an output representing said decoded address.

* * * * *